April 21, 1936. J. C. LUTZ 2,038,373

BRAKE BEAM SAFETY SUPPORT

Filed May 28, 1934

INVENTOR
Jacob C. Lutz
by J. H. Weatherford
ATTY.

Patented Apr. 21, 1936

2,038,373

UNITED STATES PATENT OFFICE 2,038,373

BRAKE BEAM SAFETY SUPPORT

Jacob C. Lutz, Memphis, Tenn.

Application May 28, 1934, Serial No. 727,924

1 Claim. (Cl. 188—210)

This invention relates to improvements in safety devices or supporting means for use in connection with trucks or railway cars, or the like, for holding up the different parts of the brake rigging in case they should drop due to disconnection, breakage, or other unforeseen conditions.

In railway car construction, it is becoming more and more necessary as speed increases, to provide safety devices for use in connection with parts which may accidentally become detached. This is particularly true of the brake beams through which the brakes are applied to the wheel. These beams are supported by hangers, so that the brake may be moved away from and against the wheels, are subject to the constant reversal of strains and to constant vibration which tends to loosen and detach them. When they do drop they are often the cause of serious accidents.

Numerous attempts have been made to provide a safety device which will accomplish this purpose. Some of these devices are more or less efficient, but are almost impossible to install, this being particularly true in regard to devices which require removal of the brake shoes and the threading of the brake beams through the device. Such devices also when once installed must be dismantled or bodily removed when it is desired to remove the brake beam assembly. It will be particularly noted in this connection that in order to insure against separation by vibration or other causes the brake shoe heads are usually riveted or welded to the brake beam proper so that an assembly is created which cannot, because of the size of these heads and irrespective of other attachments to the beam, be horizontally shifted to remove the assembly.

Others of these devices support the beams so closely as to cause the safety device to function as part of the beam support, and those which are more or less readily attached and/or permit ready removal of the beam assembly, fail to retain the same other than by direct support whereby they do not function to prevent lateral, or vertical displacement, such as is caused by the vibration of a flat wheel or the turning movement of a wheel.

The objects of the present invention are,—

First, to provide a brake beam support which may readily be positioned for attaching without disconnection of the brake beam or any of its parts, which support will prevent the beam dropping should it become disengaged, which will prevent dislodgment of the beam through lateral movement, which will largely, if not entirely prevent dislodgment through vertical movement or a combination of vertical and horizontal movement, and which will permit removal of the beam assembly without removal or dismantling of the support.

A further object is to provide a device of this kind which may be readily attached to a spring supported part of the car truck, whereby the safety support will not be subject to the vibration incident to unsprung parts.

The means by which the foregoing and other objects are accomplished, and the manner of their accomplishment, will readily be understood from the following specification on reference to the accompanying drawing, in which,—

Figure 1:
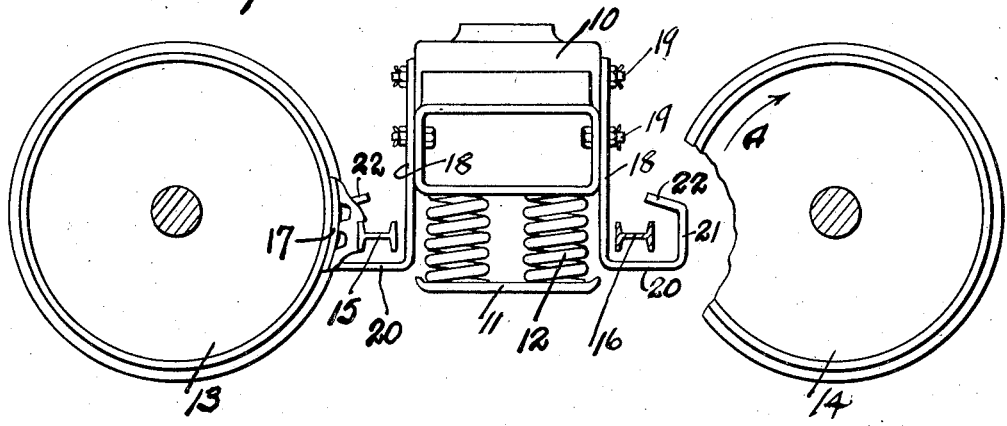
Fig. 1 is a side view of a portion of a railway truck with the truck frame removed, and showing a view of the truck bolster, spring and spring plate.
Figure 2:
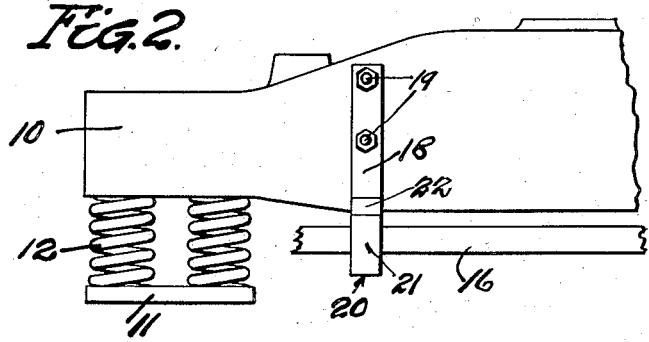
Fig. 2 is a side view of a portion of the bolster, both views showing my device in place.

Referring now to the drawing in which the various parts are indicated by numerals, 10 is a car bolster, 11 the related spring plank and 12 the springs, between such plank and bolster. 13, 14 are the wheels, and 15, 16 the respective brake beams therefor, the beam 15 being shown with a brake shoe 17 attached, and the beam 16 in section, back of the shoe, said shoe being omitted and the corresponding wheel 14 being partially broken away.

The beam supports each comprise a substantially J shaped bar having an attaching portion 18 which is secured to the bolster 10 as by bolts and nuts 19. This bar has a horizontal portion 20 extending outward from the lower end of the attaching portion, below and spaced away from, the beam 16 (or 15) with which it is to act.

Extending upwardly from the horizontal portion 20 is a vertical portion 21 which preferably has an inwardly turned upper portion 22. The end of the portion 22 is preferably spaced away from the portion 18 only enough to permit the bar being passed over the brake beam before the attaching portion 18 is secured to the bolster, or conversely the removal of the brake beam assembly without dismantling such assembly. Where the horizontal width of the brake beam is greater than the vertical depth thereof, as in the I beam section shown, it is possible to make this gap less than the horizontal dimensions of the brake beam and practically prevent accidental escape of the beam under any ordinary conditions of service.

It will be particularly noted that not only is the bottom portion 20 of the bar spaced below the supported beam, but the forward portion 21 and inwardly turned portion 22 are also spaced therefrom, whereby freedom of movement of the brake beam is permitted under normal use, and yet that this freedom of movement is secured without making it possible, in view of the shoe heads, for the beam to shift longitudinally and the end thereof to drop down in dangerous position.

To apply the bar, it is first hooked over the brake beam and is then turned upward into position against the bolster and secured as by the bolts 19, care being taken that cotter keys or other means be used with the bolts and nuts, to insure the bar against detachment from the bolster.

In use should the brake beam be disengaged from its normal support which is not here shown, it would drop down on the safety bar and be supported. Ordinarily such disengagement occurs at one end of the beam only. Should the brake beam work forward and be caught by the wheel turning as for instance in the direction of the arrow "A" and be thrown upward, disengagement from the safety bar would be prevented both by the upwardly extending forward portion and the inwardly turned portion 22. In such detached position also the beam could not shift longitudinally and an end drop down on the track. On the other hand the beam assembly could be lifted out through the top opening provided, and the assembly be removed without removal or dismantling of the supports.

It is to be understood that the form of my invention herewith shown and described is to be taken as a preferred example of the same, and that various changes in the shape, size and arrangement of parts and particularly in the method of securing it to the bolster or other parts, may be made without departing from the spirit of the invention as set out in the subjoined claim.

It will particularly be noted that the safety bar where attached to the spring supported bolster, is not subject to the intensive vibration that would occur were it attached to the spring plank or other unsprung parts; and that being entirely spaced away from the brake beam, it is not subject to jar or vibration therefrom and therefore its attachment may be more fully relied on.

Having described my invention, what I claim is:

The combination in a railway truck having a bolster of a brake beam having a compression member, the longitudinal axis of whose cross section is normally horizontal, of a safety device therefor comprising a substantially J-shaped bar, means to rigidly secure the vertical part of the bar to the bolster of the truck in abutting relation to the bolster whereby stresses to which the bar is subjected are assumed by the bolster, the end of the lower part of the bar extending inwardly toward the vertical part of the bar and having its terminal spaced from the vertical part of the bar at such a distance as to require turning of the brake beam about its horizontal axis substantially 90° to enable movement of the beam out of engagement with the bar.

JACOB C. LUTZ.